UNITED STATES PATENT OFFICE.

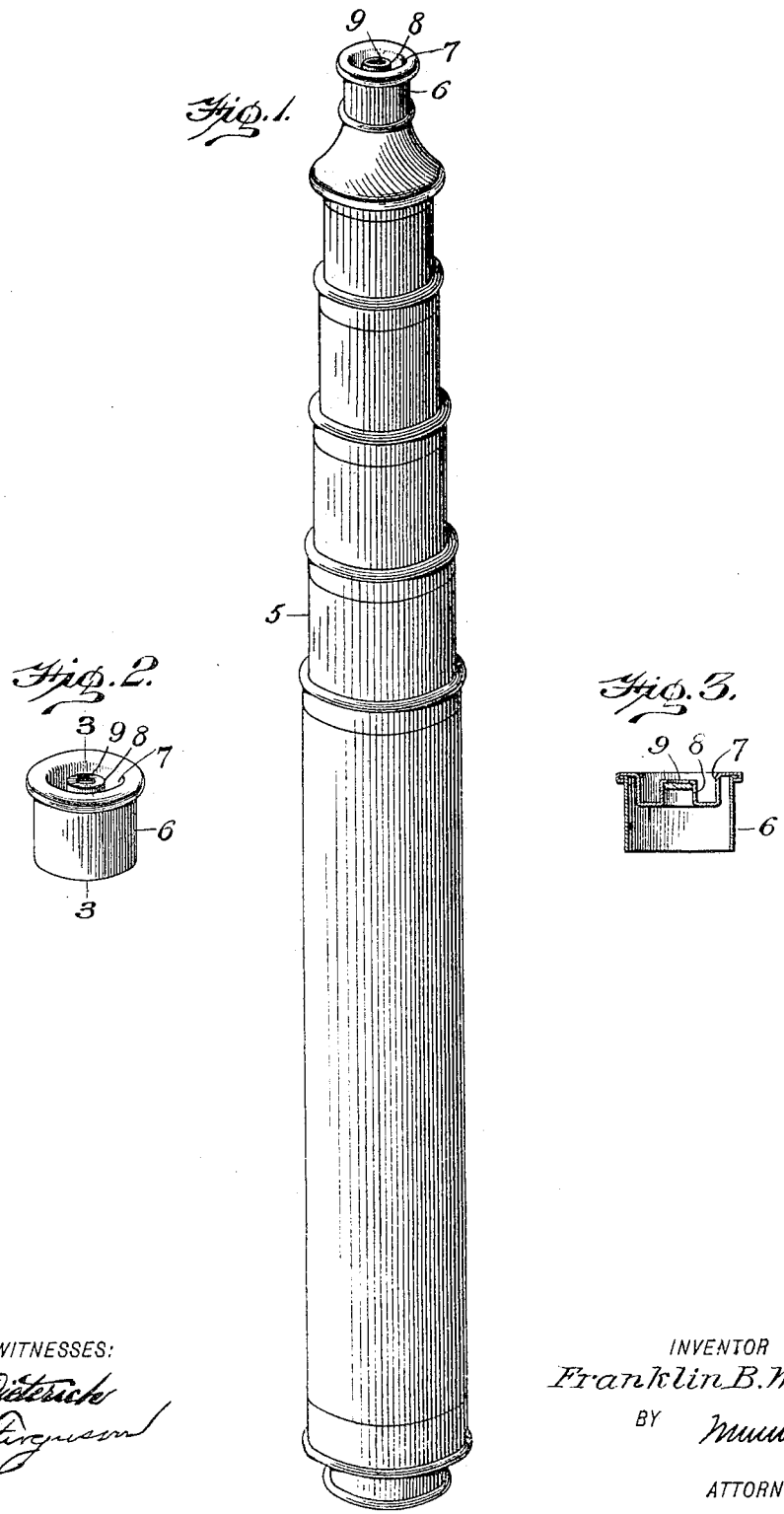

FRANKLIN B. WARNER, OF NEW YORK, N. Y.

DUST-CAP AND SOLAR EYEPIECE FOR TELESCOPES.

No. 818,802.  Specification of Letters Patent.  Patented April 24, 1906.

Application filed December 19, 1905. Serial No. 292,413.

*To all whom it may concern:*

Be it known that I, FRANKLIN B. WARNER, a citizen of the United States, and a resident of the city of New York, borough of Brooklyn, in the county and State of New York, have invented a new and Improved Dust-Cap and Solar Eyepiece for Telescopes, of which the following is a full, clear, and exact description.

The invention relates to improvements in combined dust-caps and solar eyepieces for telescopes, the object being to provide a device of this character that may be manufactured at a small cost.

I will describe a dust-cap and solar eyepiece for telescopes embodying my invention and then point out the novel features in the appended claim.

Reference is to be had to the accompanying drawings, forming a part of this specification, in which similar characters of reference indicate corresponding parts in all the figures.

Figure 1 is a perspective view of a telescope with a combined dust-cap and solar eyepiece embodying my invention thereon. Fig. 2 is a perspective view of the device, and Fig. 3 is a section on the line 3 3 of Fig. 2.

Referring to the drawings, 5 designates a telescope on which at the eye end the cap 6 is designed to be removably placed. This cap is of any suitable material and has a reëntrant portion 7, and in this reëntrant portion is an outwardly-extended tube 8, in which a lens 9, of colored glass, is placed. Obviously this cap is employed for protecting the eye-lens from dust when the telescope is not in use in the usual manner, and the cap is to be used on the telescope when making observations of the sun.

Having thus described my invention, I claim as new and desire to secure by Letters Patent—

For a telescope, a cap for the eye end, the said cap having a reëntrant portion, and a central outwardly-extended tubular member, and a colored lens in said tubular member.

In testimony whereof I have signed my name to this specification in the presence of two subscribing witnesses.

FRANKLIN B. WARNER.

Witnesses:
 JNO. M. RITTER,
 C. R. FERGUSON.